(12) United States Patent
Chen

(10) Patent No.: US 7,639,319 B2
(45) Date of Patent: Dec. 29, 2009

(54) POLYMER DISPERSED LIQUID CRYSTAL FORMULATIONS FOR MODULATOR FABRICATION

(75) Inventor: Xianhai Chen, San Jose, CA (US)

(73) Assignee: Photon Dynamics, Inc., San Jose, CA (US)

(*) Notice: Subject to any disclaimer, the term of this patent is extended or adjusted under 35 U.S.C. 154(b) by 339 days.

(21) Appl. No.: 10/593,110

(22) PCT Filed: Apr. 7, 2005

(86) PCT No.: PCT/US2005/012054
§ 371 (c)(1),
(2), (4) Date: Sep. 14, 2006

(87) PCT Pub. No.: WO2005/101113
PCT Pub. Date: Oct. 27, 2005

(65) Prior Publication Data
US 2008/0239208 A1 Oct. 2, 2008

(51) Int. Cl.
*G02F 1/1333* (2006.01)
(52) U.S. Cl. .......... 349/86
(58) Field of Classification Search .......... 349/86, 349/96
See application file for complete search history.

(56) References Cited

U.S. PATENT DOCUMENTS

| | | | |
|---|---|---|---|
| 4,024,835 A | | 5/1977 | Scheu et al. |
| 4,975,168 A | | 12/1990 | Ohno et al. |
| 5,351,143 A | * | 9/1994 | Sato et al. .......... 349/12 |
| 5,357,356 A | | 10/1994 | Konuma et al. |
| 5,405,551 A | * | 4/1995 | Reamey et al. ......... 252/299.01 |
| 5,465,052 A | | 11/1995 | Henley |
| 5,615,039 A | | 3/1997 | Henley |
| 5,695,594 A | * | 12/1997 | Lau et al. .......... 156/310 |
| 5,745,198 A | * | 4/1998 | Havens et al. .......... 349/90 |

(Continued)

FOREIGN PATENT DOCUMENTS

CN 1938398 A 3/2007

(Continued)

OTHER PUBLICATIONS

Merck Specialty Chemicals Ltd., Southhampton, England, "Polymer Dispersed Liquid Crystals (PDLC)," Apr. 5, 2002, 15 pages.*

(Continued)

*Primary Examiner*—Uyen-Chau N Le
*Assistant Examiner*—Chris H Chu
(74) *Attorney, Agent, or Firm*—Townsend and Townsend and Crew LLP

(57) ABSTRACT

Embodiments of polymer dispersed liquid crystals (PDLCs) in accordance with the present invention comprise TL-series liquid crystal materials and a polymer matrix comprising polyacrylate resins having hydroxyl groups. These hydroxyl groups allow crosslinking by using isocyanate, improving mechanical properties and heat resistance. Typical ratios of liquid crystal to polymer range between about 50/50 to 70/30 (wt/wt). The PDLC materials exhibit enhanced sensitivity to driving voltages and higher transmission~voltage (T-V) curve slope. In testing thin film transistors (TFTs), these PDLC materials can be used to compensate for an increased air gap accommodating flatness variation in the TFT substrate, and to reduce electrostatic forces between modulator and panel. Embodiments of PDLC materials in accordance with the present invention form solid films upon evaporation of the solvent. Homogeneity of embodiments of solvent-based PDLC formulations in accordance with the present invention allow for the use of many different coating methods, such as spin, doctor blade, and slot-die coatings.

12 Claims, 4 Drawing Sheets

U.S. PATENT DOCUMENTS

| | | | |
|---|---|---|---|
| 6,012,858 | A | 1/2000 | Konishi et al. |
| 6,110,327 | A | 8/2000 | Rukavina et al. |
| 6,128,056 | A | 10/2000 | Kubota et al. |
| 6,151,153 | A | 11/2000 | Bryan |
| 6,211,991 | B1 | 4/2001 | Bryan |
| 6,349,086 | B2 | 2/2002 | Nishida et al. |
| 6,392,725 | B1 | 5/2002 | Harada et al. |
| 6,866,887 | B1 | 3/2005 | Chen et al. |
| 7,099,067 | B2 | 8/2006 | Chen et al. |
| 2001/0018093 | A1 | 8/2001 | Decre |
| 2002/0130033 | A1 | 9/2002 | Beitinger et al. |
| 2002/0155280 | A1 | 10/2002 | Yang |
| 2005/0077005 | A1* | 4/2005 | Chen et al. ............... 156/286 |

FOREIGN PATENT DOCUMENTS

| | | |
|---|---|---|
| JP | 8194208 A | 7/1996 |
| JP | 2000-001675 | 1/2000 |
| JP | 2001192289 A | 7/2001 |

OTHER PUBLICATIONS

JP 8-194208 (Dainippon Printing Co) Jul. 30, 1996, machine translation.*

Merck Specialty Chemicals Ltd., Southampton, England, "Polymer Dispersed Liquid Crystals (PDLC)," lasted revised: Apr. 5, 2002, 15 pages total.

PCT Preliminary Report on Patentability for Application No. PCT/US2005/012054, Dated Oct. 11, 2006.

PCT International Search Report of the International Searching Authority for Application No. PCT/US2005/012054, Dated Jul. 19, 2006.

PCT Written Opinion of the International Searching Authority for Application No. PCT/US2005/012054, Dated Jul. 19, 2006.

English Translation of CN Office Action for Application No. 200580010165.6, mailed Aug. 14, 2009, 10 pages total.

* cited by examiner

POLYMER DISPERSED LIQUID CRYSTAL FORMULATIONS FOR MODULATOR FABRICATION

CROSS-REFERENCES TO RELATED APPLICATIONS

The present application claims priority from U.S. application Ser. No. 10/821,810, filed Apr. 8, 2004, entitled "POLYMER DISPERSED LIQUID CRYSTAL FORMULATIONS FOR MODULATOR FABRICATION", the content of which is incorporated herein by reference in its entirety.

BACKGROUND OF THE INVENTION

This invention relates to liquid crystal materials for use in electro-optic applications. More particularly, this invention relates to PDLC (polymer dispersed liquid crystal) materials.

Voltage imaging technology may be employed to detect and measure for defects in flat panel thin film transistor (TFT) arrays. According to this measurement technique, the performance of an array is simulated as if it were assembled into a TFT cell and then the characteristics of a TFT array are measured by indirectly measuring actual voltage distribution on the panel, or so-called voltage imaging, using an electro-optic (EO) light modulator-based detector.

A voltage imaging system in its most basic form includes an electro-optic (EO) modulator, an imaging objective lens, a charge coupled device (CCD) camera or other appropriate or similar sensor, and an image processor. The electro-optic sensor of the EO modulator is based on the light scattering characteristics of nematic liquid crystal droplets in a polymer matrix (polymer dispersed liquid crystal, or PDLC) film. In operation, the EO modulator is placed approximately 5-30 microns above the surface of a thin film transistor (TFT) array, and a voltage bias is applied across a transparent electrode of a layer of indium tin oxide (ITO) on a surface of the EO modulator. Thereupon, the EO modulator capacitively couples to the TFT array so that an electric field associated with the TFT array is sensed by the PDLC layer. Intensity of incident light transmitted through the PDLC layer is varied, i.e., is modulated, by any variations in the electric field strength across the liquid crystal (LC) material in the PDLC. This light is then reflected off a dielectric mirror and collected by the CCD camera or like sensor. A source of incident radiation, which may be for example infrared or visible light, is provided to illuminate the sandwich of TFT array, PDLC film and dielectric mirror.

The known method for EO modulator fabrication makes use of commercial NCAP (nematic curvilinear aligned phase) material, which is a form of PDLC that is suitable for making very large area light valves and displays. The NCAP device consists of micron size droplets of liquid crystal dispersed in and surrounded by a polymer film, such as in a sandwich between two layers of ITO Mylar film. Two patents, assigned to Photon Dynamics Inc., describe such processes: "Modulator Transfer Process and Assembly", Michael A. Bryan, U.S. Pat. No. 6,151,153 (2000); and "Modulator Manufacturing Process and Device", Michael A. Bryan, U.S. Pat. No. 6,211,991 B1 (2001). These patents are hereby incorporated by reference for all purposes.

While the above references are suitable for certain applications, there is a need in the art for improved electro-optic materials.

SUMMARY OF THE INVENTION

Embodiments of polymer dispersed liquid crystals (PDLCs) in accordance with the present invention comprise TL-series liquid crystal materials and a polymer matrix comprising polyacrylate resins having hydroxyl groups. These hydroxyl groups allow crosslinking by using isocyanate, improving mechanical properties and heat resistance. Typical ratios of liquid crystal to polymer ranged between about 50/50 to 70/30 (wt/wt). The PDLC materials exhibited enhanced sensitivity to driving voltages and higher transmission ~voltage (T-V) curve slope. In testing thin film transistors (TFTs), these PDLC materials can be used to compensate for an increased air gap accommodating flatness variation in the TFT substrate, and to reduce electrostatic forces between modulator and panel. Embodiments of PDLC materials in accordance with the present invention form solid film upon evaporation of the solvent. The homogeneity of embodiments of solvent-based PDLC formulations in accordance with the present invention allow for the use of many different coating methods, such as spin, doctor blade, and slot-die coatings.

An embodiment of a composition in accordance with the present invention comprises a liquid crystal dispersed within a polymer matrix, the polymer matrix formed by the cross-linking of a polyacrylate resin and a polyisocyanate resin. The liquid crystal exhibits a minimum bulk resistivity of $1 \times 10^{12}$ ohm.cm, and a voltage holding ratio (VHR) of 98% or greater.

An embodiment of a method in accordance with the present invention for detecting defective operation of an electro-optical device, comprises, disposing a polymer dispersed liquid crystal (PDLC) overlying and separated from an underlying electro-optical device by an air gap. The PDLC has a polymer matrix formed by the cross-linking of a polyacrylate resin and a polyisocyanate resin, and has a liquid crystal exhibiting a minimum bulk resistivity of $1 \times 10^{12}$ ohm·cm and a voltage holding ratio (VHR) of 98% or greater. A voltage is applied to a transparent electrode overlying the PDLC while illuminating the PDLC, and a changed intensity of light transmitted by the PDLC is detected.

An embodiment of an apparatus in accordance with the present invention for inspecting a semiconductor device, comprises, a support for a semiconductor device, and an electro-optic modulator separated from the support by an air gap. The electro-optic modulator comprises a mirror disposed proximate to the support, a transparent electrode distal from the support, and a polymer dispersed liquid crystal (PDLC) sensor material disposed between the transparent electrode and the mirror. The PDLC has a polymer matrix formed by the cross-linking of a polyacrylate resin and a polyisocyanate resin, and a liquid crystal exhibiting a minimum bulk resistivity of $1 \times 10^{12}$ ohm·cm and a voltage holding ratio (VHR) of 98% or greater. The apparatus further comprises a light source configured to illuminate the PDLC material during application of a voltage to the transparent electrode, and a detector configured to detect intensity of light reflected by the mirror.

The invention will be better understood by reference to the following detailed description in connection with the accompanying drawings.

DETAILED DESCRIPTION OF THE INVENTION

Embodiments of polymer dispersed liquid crystals (PDLCs) in accordance with the present invention comprise TL-series liquid crystal materials and a polymer matrix comprising polyacrylate resins having hydroxyl groups. These hydroxyl groups allow crosslinking by using isocyanate, improving mechanical properties and heat resistance. Typical ratios of liquid crystal to polymer ranged between about 50/50 to 70/30 (wt/wt). The PDLC materials exhibited enhanced sensitivity to driving voltages and higher transmission ~voltage (T-V) curve slope. In testing thin film transistors (TFTs), these PDLC materials can be used to compensate for an increased air gap accommodating flatness variation in the TFT substrate, and to reduce electrostatic forces between modulator and panel. Embodiments of PDLC materials in accordance with the present invention form solid film upon evaporation of the solvent. The homogeneity of embodiments of solvent-based PDLC formulations in accordance with the present invention allow for the use of many different coating methods, such as spin, doctor blade, and slot-die coatings.

EO Modulator Fabrication and Structure

Figure 1:
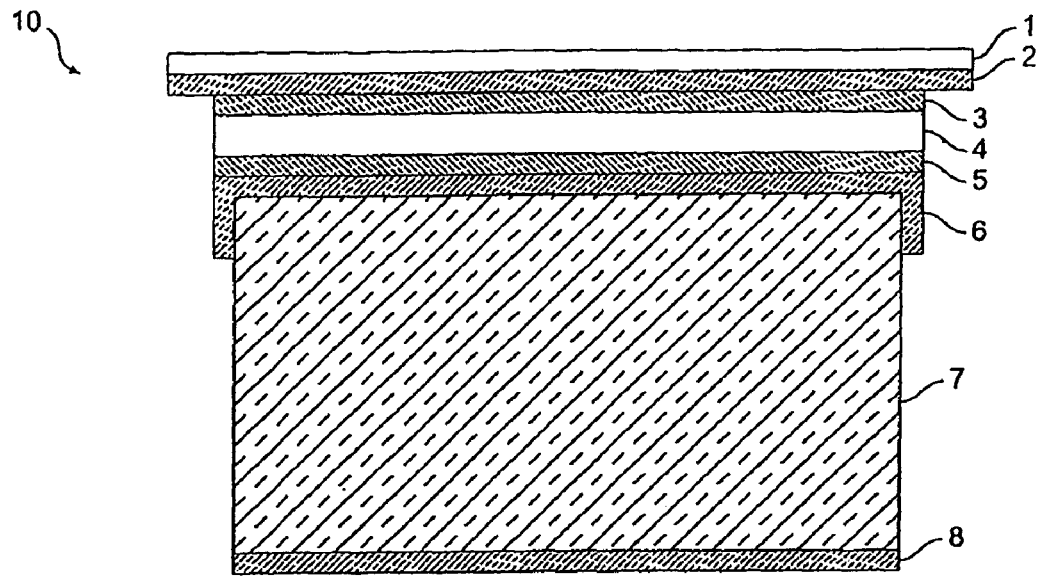
FIG. 1 is a schematic cutaway view of an electro-optic device.

Referring to FIG. 1, there is shown an electro optic (EO) sensor 10 of an EO modulator fabricated in accordance with the invention. A polyester film layer 1, which is typically a thin Mylar™ film, provides substrate support for a dielectric mirror 2. The substrate/mirror combination is bonded via a thin layer of adhesive 3 to a layer of electro-optic sensor material, specifically a coating of polymer dispersed liquid crystal (PDLC) 4. The PDLC 4 is a directly applied coating on an optional layer of silicon dioxide 5. There is a layer of a transparent electro material, such as indium tin oxide (ITO 6) which in turn is bonded directly to an optical glass substrate 7, which is for example a block of type BK-7 optical glass. The glass substrate or block 7 is optically flat and has an antireflective coating 8 on the optically-smooth surface opposing the PDLC 4 surface.

Figure 2:
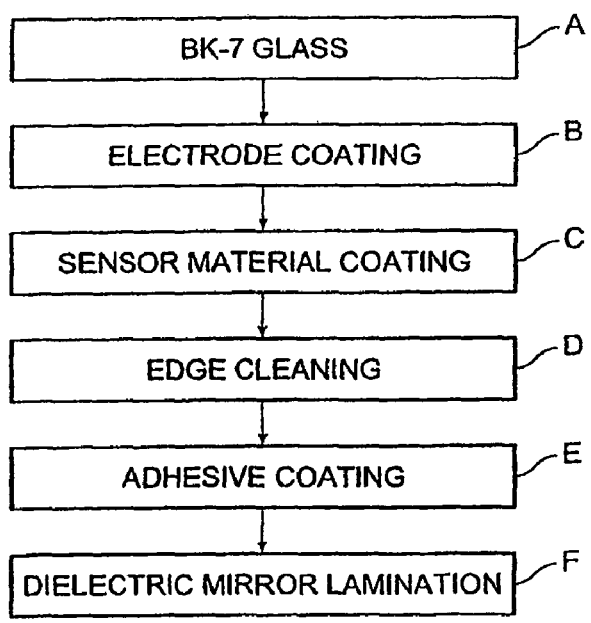
FIG. 2 is a flow chart of steps for fabricating an electro-optic device.

Referring to FIG. 2, the process of fabricating the EO sensor 10 according to the invention is illustrated. The pre-step is the provision of the optical glass substrate 7, such as the block of BK-7 glass, which may be precoated with an antireflective layer 8 (Step A).

1) Electrode Coating on Optical Glass Substrate:

As a first step in the fabrication process, an electrode coating is applied to the optical surface of the glass substrate 7 (Step B). Any conductive coating that is transparent at the wavelengths of interest can be used for this application. Indium tin oxide (ITO) is well-known and preferred. Optionally, as part of Step B, a layer of silicon dioxide ($SiO_2$) 4 may be overlaid on top of the conductive coating 6, which improves its durability, surface wetting properties, and adhesion with sensor materials 4. The electrode coating covers the top surface, two opposite edges and side surfaces for electrical connection.

2) Sensor Material Coating:

The sensor material 4 is then applied over the electrode 6 (and optional silicon dioxide layer 7) (Step C). Any material with electro-optical response can be used. However, the preferred material includes polymer dispersed liquid crystal (PDLC), which is a gelatinous but potentially volatile liquid. Materials which are known to be suitable are designated as i) TL-205/AU1033; ii) TL-205/PMMA; ii) E7/poly(methyl methacrylate) (PMMA); and iv) E7/AU-1033. Other PDLC formulations are described in detail below.

In the fabrication process, the following coating processes can be used: doctor blade, wired bar, slot die, spin, and meniscus. A process based on spin coating is preferred.

3) Edge Cleaning:

Thereafter, depending on the coating method, edge cleaning might be needed (Step D). It is preferred to use a plastic 'knife' (such as Mylar™ sheet not shown) to remove the edge without damaging the ITO coating on the edges.

4) Adhesive Coating:

Thereafter a thin adhesive film 3 is applied to the stack (Step E). Water-based adhesives must be used to coat on top of sensor material 4 to prevent damaging the sensor material surface. Such materials include polyurethane dispersions such as Neorez brand R-967 manufactured by Neoresins of Wilmington, Mass., acryl ate dispersions, and waterborne epoxies. The adhesives must be water based and may contain for example dispersions of silica or other low refractive index dielectric nanoparticles that are not chemically reactive in this context.

5) Dielectric Mirror ("Pellicle") Lamination:

Finally, a dielectric stack 2 preformed on a thin polyester film 1 (such as 7 micron thick Mylar™) is applied by a lamination process on top of the adhesive layer 3 (Step F). A vacuum assisted lamination process is preferred, as explained below. The sides of the oversized pellicle 1, 2 (FIG. 1) may then be bent down and taped or otherwise fastened onto the substrate 7 to form the sensor plate, and electrode terminals can be connected to the ITO layer on the sides.

Figure 3:
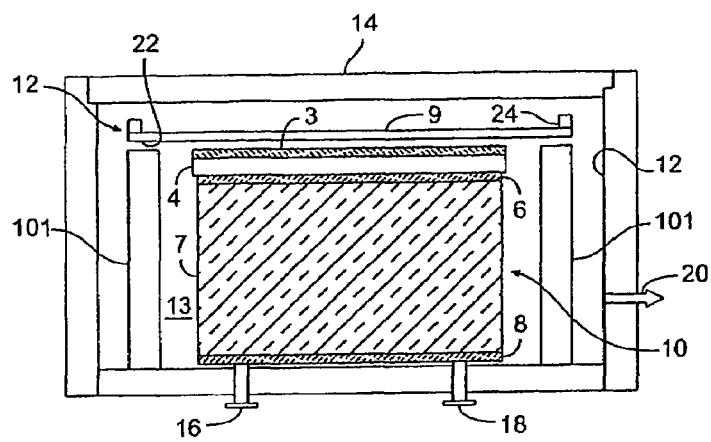
FIG. 3 is a schematic cutaway view of a vacuum chamber useful for laminating the dielectric mirror onto a layer of PDLC.

Referring to FIG. 3, a suitable vacuum chamber 12 is depicted for use in the lamination process. The layers are exaggerated in height as depicted. The work-piece or EO sensor 10, comprising the glass block 7 with ITO layer 6, silicon dioxide layer (not shown in FIG. 3), PDLC layer 4 and adhesive layer 3, is contained in the inner chamber 13, which is bounded by a positioning fixture 101 and which is in gas communication with a vacuum source 20. A pellicle 9 of dielectrically-coated polymer film 9 is mounted on an O-ring frame 24 and disposed to juxtapose the film 9 with the surface coated with the adhesive 3. The O-ring 24 may pinch the film 9 against posts of the fixture 101 with enough of a gap 22 to assure pressure equalization within the chamber. In the vacuum assisted process (Step F), the adjustment screws 16, 18 are automatically or manually advanced so that the adhesive layer 3 approaches the pellicle 9 and encounters it slightly off angle to the normal, so that only one side initially engages the pellicle. The block 7 is kept at this slight angle as it is pressed further against the stretchable pellicle 9, causing it to progressively engage the adhesive layer. The vacuum level, typically around one half atmosphere to about 0.8 atmosphere, and preferably about 0.75 atmosphere, prevents air bubbles from forming between the juxtaposed surfaces during lamination. The vacuum should not be so great as to cause excessive out gassing from volatile materials.

The foregoing is a simplified process compared with prior processes used to fabricate modulators. It yields a device with excellent surface flatness, surface smoothness, mechanical stability and improved sensitivity as compared with prior EO sensors. The manufacturing cost is significantly reduced due to choice of materials and simplified fabrication.

PDLC Formulations

Embodiments in accordance with the present invention relate to PDLC formulations which may be used in conjunction with electro-optical devices. Specifically, these PDLC formulations may be used to fabricate electro-optical modulator exhibiting both high sensitivity and strong mechanical properties, as may be used in testing thin film transistors (TFTs).

Figure 4:
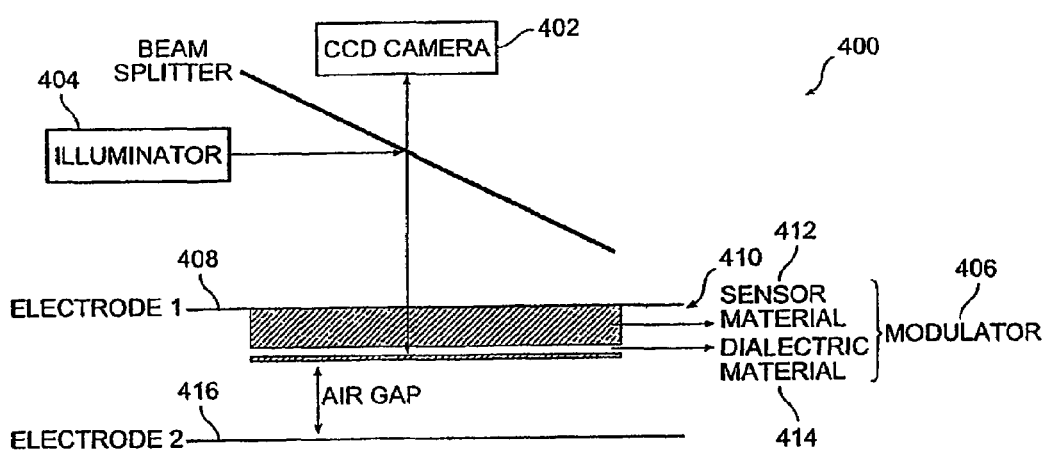
FIG. 4 is a Schematic description of the Voltage Imaging® system.

Voltage Imaging® is a non-contact technique for detecting defects in thin film transistors (TFTs). FIG. 4 shows a simplified cross-sectional view of the structure of Voltage Imaging Optical System (VIOS). VIOS 400 mainly includes CCD camera 402, illuminator 404, optical lens (not shown in FIG. 4), and electro-optical modulator 406.

The major components of an electro-optical modulator include: first electrode 408 comprising a transparent electrically conducting material such as indium tin oxide (ITO) positioned on a glass substrate 410 such as BK-7; sensor material 412 such as a PDLC, which exhibits an electro-optical response to an applied electric field; and dielectric mirror 414.

By applying voltage on electrode 408 while grounding a second electrode 416, a transmission-voltage (T-V) curve can be obtained. For testing of TFTs, if a constant voltage near the middle of the response curve is applied on the modulator, the voltage applied on each pixel can be detected by the CCD camera as a change in light intensity. Therefore, a defective pixel can be detected by virtue of abnormality of its optical response.

The voltage applied between electrode 1 and 2 can be expressed by the following equations:

$$V_{Bias} = V_{sensor} + V_{pellicle} + V_{air}; \quad (1)$$

$$V_{Bias} = V_{sensor}[1 + (\epsilon_{sensor} * d_{pellicle})/(\epsilon_{pellicle} * d_{sensor}) + (\epsilon_{sensor} * d_{air})/d_{sensor}], \text{where}: \quad (2)$$

$V_{Bias}$ = Voltage applied between Electrode 1 and Electrode 2;
$V_{sensor}$ = Required voltage for sensor material;
$V_{pellicle}$ = voltage across pellicle gap;
$V_{air}$ = voltages across air gap; and
$\epsilon$ = Dielectric constant.

Therefore, with a given $V_{Bias}$, $d_{pellicle}$, and $\epsilon_{pellicle}$, the air gap ($d_{air}$) is a function of required voltage ($V_{sensor}$), dielectric constant ($\epsilon_{sensor}$), and thickness ($d_{sensor}$) of the sensor material (PDLC).

Sensitivity of the modulator is directly proportional to the slope of the T-V curve. Modulator sensitivity is related to the following parameters: size distribution of liquid crystal droplets in the sensor material; interface properties between the polymer matrix and the liquid crystal; and the size of the air gap. Modulator sensitivity decreases as the air gap increases.

For TFT testing, with an increase in the size of the modulator, the air gap needs to be increased to accommodate the TFT glass substrate flatness variation and to reduce the electrostatic force between modulator and panel. Therefore, a sensor material is needed which exhibits both a lower driving voltage and a higher T-V curve slope or sensitivity, in order to compensate the increased air gap.

In accordance with embodiments of the present invention, solvent-based PDLC formulations are selected as sensor materials based upon the following criteria. First, the PDLC formulation is a homogeneous solution allowing many coating methods, including spin coating, doctor blade coating, and slot-die coating, to be used. Second, the PDLC material forms a solid film once the solvent is evaporated.

In accordance with embodiments of the present invention, polyacrylate resins with hydroxyl groups were used as the polymer matrix, and TL-series of liquid crystals manufactured by EM Industries of Hawthorne, N.Y., were dispersed therein to formulate the polymer dispersed liquid crystal having the desired properties. In general terms, the TL-series provide high stability, resistivity and voltage holding ratio (VHR) characteristics. For example, the materials exhibit a minimum bulk resistivity of $1 \times 10^{12}$ ohm·cm, and a VHR of greater than 98% is obtainable. Table 1 below summarizes various properties of members of the TL-series:

TABLE 1

| Property | TL-Series No. | | | | | | |
| --- | --- | --- | --- | --- | --- | --- | --- |
|  | TL202 | TL203 | TL204 | TL205 | TL213 | TL215 | TL216 |
| S—N (° C.) | 1 | 20 | −6 | <−20 | <−20 | <−20 | <−20 |
| N—I (° C.) | 83 | 77 | 92 | 87 | 87 | 82 | 80 |
| Viscosity (cSt) 20° C. | 37 | 37 | 43 | 45 | 49 | 44 | 36 |
| $\Delta\epsilon$ (1 kHz, 20° C.) | +6.1 | +11 | +4.8 | +5.0 | +5.7 | +8.5 | +5.5 |
| $\epsilon//$ (1 kHz, 20° C.) | 9.6 | 15.2 | 8.9 | 9.1 | 10.0 | 12.8 | 9.7 |
| V(10, 0, 20) | 2.73 | 1.92 | 2.88 | 2.75 | N/A | N/A | N/A |
| V(90, 0, 20) | 3.70 | 2.62 | 3.83 | 3.79 | N/A | N/A | N/A |
| $\Delta n$ (589 nm, 20°) | 0.1851 | 0.2013 | 0.207 | 0.217 | 0.239 | 0.204 | 0.211 |
| $n_o$ (589 nm, 20°) | 1.5230 | 1.529 | 1.521 | 1.527 | 1.527 | 1.520 | 1.523 |
| $k_{11}$ ($10^{-12}$N), 20° C. | 19.10 | 15.80 | 18.60 | 17.30 | 16.8 | 14.1 | 14.4 |
| $k_{33}$ ($10^{-12}$N), 20° C. | 20.10 | 17.90 | 20.50 | 20.40 | 22.0 | 18.7 | 19.6 |
| $k_{33}/k_{11}$ | 1.05 | 1.13 | 1.10 | 1.18 | 1.30 | 1.33 | 1.36 |

The TL213 material exhibits a high birefringence value. The TL215 material exhibits increased dielectric anisotropy. The TL216 material exhibits lower viscosity.

Figures 7, 8:
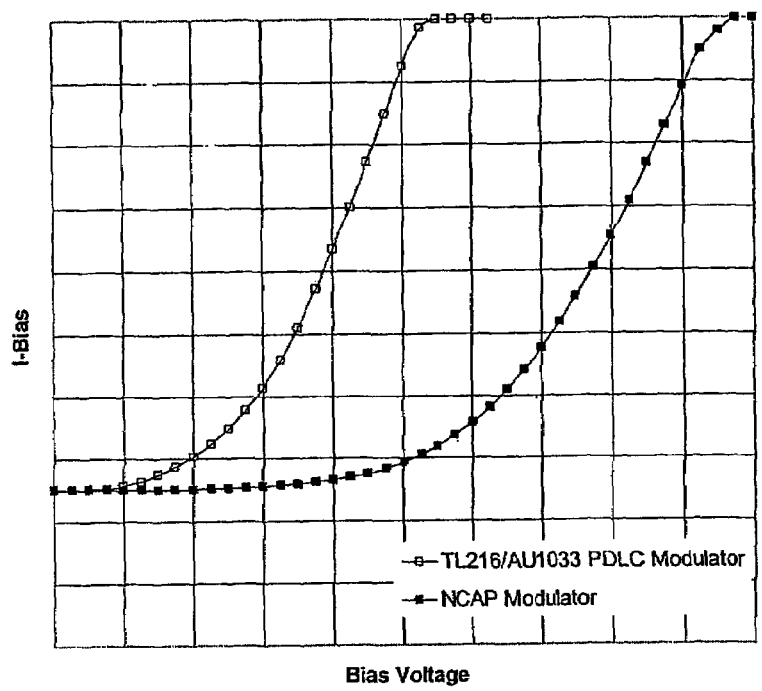
FIG. 7 plots the T-V curve for still another embodiment of a PDLC modulator in accordance with the present invention.
FIG. 8 shows a simplified view of the resin cross-linking reaction utilized to form one embodiment of a PDLC material in accordance with the present invention.

FIG. 8 is a simplified schematic diagram, showing that hydroxyl groups 800 in polymer resins of the matrix 802 allow crosslinking by using isocyanate 804, and thus improve mechanical properties and heat resistance of the resulting PDLC. Examples of polymer resins which may be utilized in accordance with embodiments of the present invention include, but are not limited to, Paraloid AU1033 available from Rohm & Haas of Philadelphia, Pa., and Doresco TA45-8 and TA65-1 available from Dock Resins of Linden, N.J., and the Desmodur N-75 resin available from Bayer Polymers of Pittsburgh, Pa.

Specifically, FIG. 8 shows that after reaction, the multiple hydroxyl groups of the Paraloid AU1033 polyacrylate resin react with the isocyanate groups of the Desmodur N75 to form the strengthening crosslinked urethane network structure. In accordance with embodiments of the present invention, the typical ratio of liquid crystal to polymer is between 50/50 to 70/30 (wt/wt).

The TL-series of liquid crystal materials also exhibits low dielectric constant. Thus under the VIOS system setup as shown in FIG. 4, the low dielectric constant layer will have a relatively higher voltage even with same total V-Bias.

The modulator may be manufactured by using spin coating process, for example that disclosed in co-pending U.S. patent application Ser. Nos. 10/685,687 and 10/686,367, incorporated by reference herein for all purposes.

EXAMPLES

Example 1

7.54 g of Paraloid AU1033, 8.10 g of TL-205 liquid crystal, 5.30 g of methyl isobutyl ketone, and 0.66 g of Desmodur N-75 (Bayer) were added into a glass vial and stirred overnight. 0.1% of Metacure T-12 catalyst (based on total formulation) was then added into the homogeneous mixture and stirred for another 10 minutes.

The mixture was then filtered with 1 micron PTFE filter and spin coated onto a 135.5×135.5 mm square ITO glass substrate. The thickness of PDLC coating layer was controlled at ~17-18 microns by spinning recipe. A thin layer of Neorez R-967 adhesive was coated on top of PDLC coating, and then the 2-layer coating was laminated with the dielectric mirror, with 7 micron Mylar support.

Figure 5:
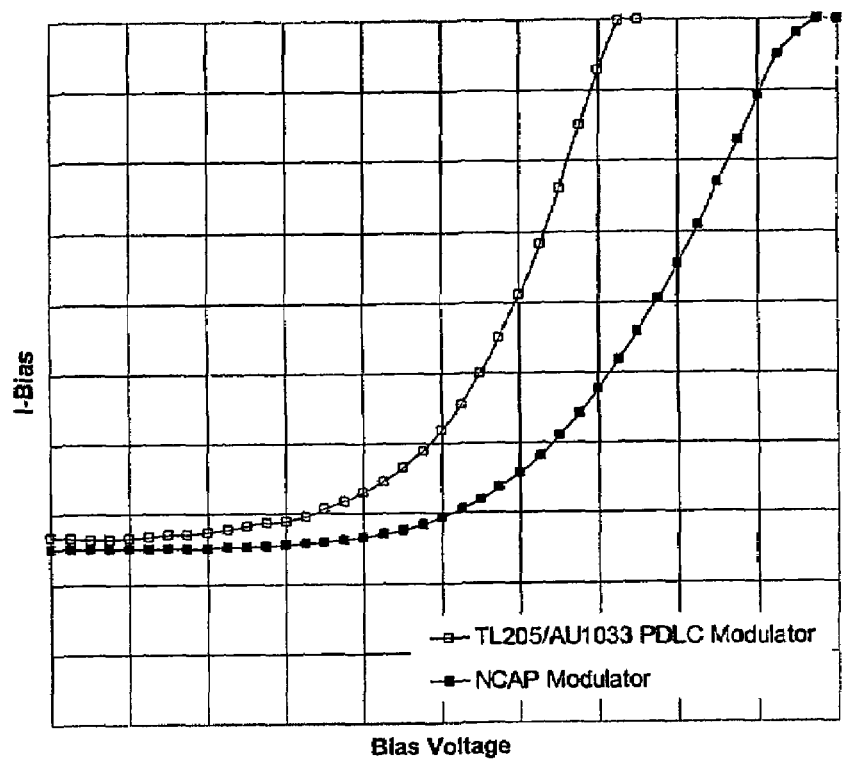
FIG. 5 plots the transmission vs. voltage (T-V) curve of one embodiment of a PDLC modulator in accordance with the present invention.

FIG. 5 shows the resulting Transmission~Voltage curve obtained using the setup in FIG. 4 with a 15 micron air gap. At a set I-Bias level, the driving voltage for PDLC was reduced by 22% and the slope of the Transmission~Voltage curve (or sensitivity) was increased by 27%, compared to NCAP (Nematic Curvilinear Aligned Phase acquired from Xymox Technologies, Inc. of Milwaukee, Wis.) modulator.

Example 2

Figure 6:
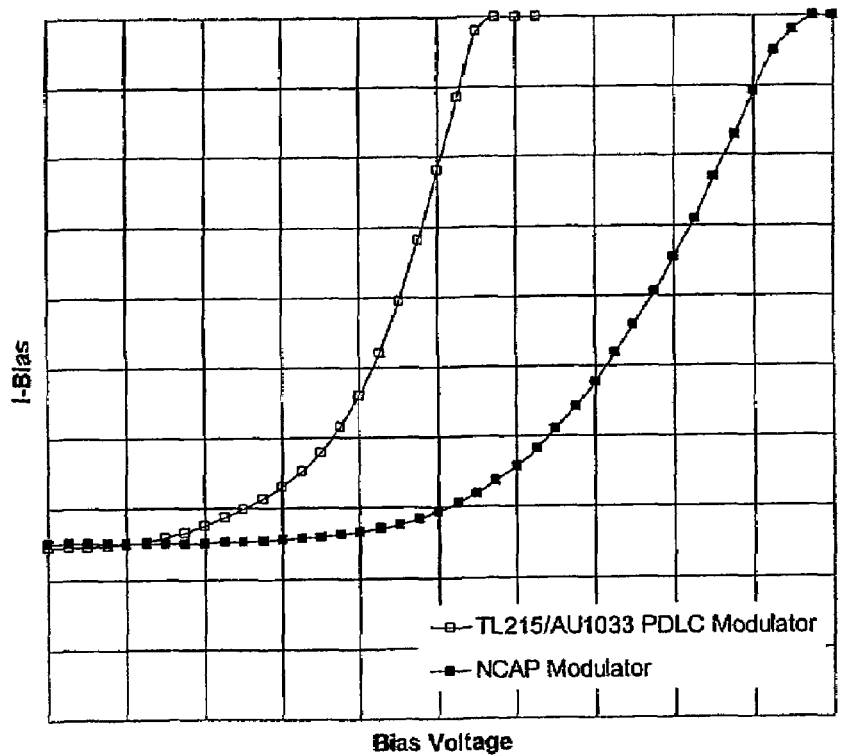
FIG. 6 plots the T-V curve for another embodiment of a PDLC modulator in accordance with the present invention.

For this example, the same compositions, relative concentrations, and process were used as Example 1, except TL-215 was used as the liquid crystal. The PDLC coating thickness was 17-18 microns. The T-V curve (with 15 micron air gap) is shown in FIG. 6. The driving voltage was reduced by 41% and the slope of the Transmission~Voltage curve (or sensitivity) increased by 60% at the set I-Bias level. Again, the performance of the NCAP material provided for purposes of comparison shows reduced sensitivity.

Example 3

For this example, the same compositions, relative concentrations, and process were used as in Example 1, except TL-216 was used as the liquid crystal. The PDLC coating thickness was ~16-17 microns. The T-V curve (with 15 micron air gap) is shown in FIG. 7. The driving voltage was reduced by 48% and the slope of the Transmission~Voltage curve (or sensitivity) increased by 40% at the set I-Bias level. Again, the reduced sensitivity exhibited by the NCAP modulator is provided for purposes of comparison.

While the PDLC formulations described above may be employed in the modulator devices illustrated in FIGS. 1-3, these materials are not limited to this specific application. In accordance with alternative embodiments, the disclosed PDLC formulations can be used for other electro-optical devices, including but not limited to light shutters and displays.

Embodiments of PDLC formulations in accordance with the present invention offer a number of benefits. One benefit is improved defect detection sensitivity. Specifically, with fixed system noise, the high T-V curve slope of the modulator generates a larger signal, so that the signal-to-noise ratio has been improved.

Another benefit offered by PDLC formulations in accordance with the present invention is higher air gap with lower driving voltage. Specifically, since the PDLC materials can function with a lower driving voltage, the same transmission level can be reached at higher air gap. Embodiments of PDLC formulations in accordance with the present invention would be expected to operate under a driving voltage of between about 100 and 320 V across an air gap of 15 µm or greater.

Still another benefit offered by PDLC formulations in accordance with the present invention is improved durability. Specifically, a larger air gap can reduce the probability of damage caused by particles on the testing panel.

The invention has been explained with reference to specific embodiments. Other embodiments will be evident to those of ordinary skill in the art. It is therefore not intended that the invention be limited, except as indicated by the appended claims.

What is claimed is:

1. A method of detecting defective operation of an electro-optical device, the method comprising:
    disposing a polymer dispersed liquid crystal (PDLC) overlying and separated from an underlying electro-optical device by an air gap, the PDLC having a polymer matrix formed by the cross-linking of a polyacrylate resin and a polyisocyanate resin, and having a liquid crystal exhibiting a minimum bulk resistivity of $1 \times 10^{12}$ ohm·cm and a voltage holding ratio (VHR) of 98% or greater;
    applying a voltage to a transparent electrode overlying the PDLC while illuminating the PDLC; and
    detecting a changed intensity of light transmitted by the PDLC.

2. The method of claim 1 wherein the PDLC is disposed over a glass substrate bearing a thin film transistor.

3. The method of claim 1 wherein the changed intensity of light is detected by reflection of the incident light by a mirror.

4. The method of claim 1 wherein the PDLC comprises a ratio of liquid crystal to polymer of between about 50/50 and 70/30 (wt/wt).

5. The method of claim 1 wherein the applied voltage is between about 100-320 V across an air gap of at least 5 µm.

6. The method of claim 1 wherein the polyacrylate resin is selected from the group consisting of Paraloid AU1033 available from Rohm and Haas, and Doresco TA45-8or Doresco TA65-1 available from Dock Resins.

7. The method of claim 1 wherein the polyisocyanate resin comprises an aliphatic polyisocyanate such as Desmodur N-75 from Bayer Polymers.

8. The method of claim 1 wherein the liquid crystal is selected from the TL series available from EM Industries.

9. An apparatus for inspecting a semiconductor device, the apparatus comprising:
   a support for a semiconductor device;
   an electro-optic modulator separated from the support by an air gap, the electro-optic modulator comprising,
      a mirror disposed proximate to the support,
      a transparent electrode distal from the support, and
      a polymer dispersed liquid crystal (PDLC) sensor material disposed between the transparent electrode and the mirror, the PDLC having a polymer matrix formed by the cross-linking of a polyacrylate resin and a polyisocyanate resin, and a liquid crystal exhibiting a minimum bulk resistivity of $1 \times 10^{12}$ ohm·cm and a voltage holding ratio (VHR) of 98% or greater;
   a light source configured to illuminate the PDLC material during application of a voltage to the transparent electrode; and
   a detector configured to detect intensity of light reflected by the mirror.

10. The apparatus of claim 9 wherein the support comprises a support for a workpiece bearing a thin film transistor.

11. The apparatus of claim 9 wherein the air gap has a width of between about 5-30 μm, and a voltage of about 100-320 V is configured to be applied to the transparent electrode.

12. The apparatus of claim 9 wherein the liquid crystal is selected from the TL series available from EM Industries.

* * * * *